United States Patent
Aberle et al.

(10) Patent No.: US 9,126,868 B2
(45) Date of Patent: *Sep. 8, 2015

(54) PROCESS AND ADDITIVE TO IMPROVE ADHESION OF COMPOSITIONS TO SUBSTRATES

(75) Inventors: Thomas Aberle, Nottwil (CH); Robert Koelliker, Oberkirch (CH)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/124,330

(22) PCT Filed: Jun. 7, 2012

(86) PCT No.: PCT/EP2012/060780
§ 371 (c)(1),
(2), (4) Date: Dec. 6, 2013

(87) PCT Pub. No.: WO2012/168347
PCT Pub. Date: Dec. 13, 2012

(65) Prior Publication Data
US 2014/0113078 A1     Apr. 24, 2014

Related U.S. Application Data

(60) Provisional application No. 61/495,560, filed on Jun. 10, 2011.

(30) Foreign Application Priority Data

Jun. 10, 2011  (EP) ..................... 11169505

(51) Int. Cl.
| C04B 40/00 | (2006.01) |
| C04B 24/38 | (2006.01) |
| C08J 3/12  | (2006.01) |
| C08K 5/00  | (2006.01) |
| C04B 28/02 | (2006.01) |
| C04B 28/14 | (2006.01) |
| C04B 20/10 | (2006.01) |
| C08J 3/21  | (2006.01) |
| C09J 105/00| (2006.01) |
| C08L 1/28  | (2006.01) |

(52) U.S. Cl.
CPC ........... *C04B 24/383* (2013.01); *C04B 20/1048* (2013.01); *C04B 24/38* (2013.01); *C04B 28/02* (2013.01); *C04B 28/14* (2013.01); *C08J 3/12* (2013.01); *C08J 3/21* (2013.01); *C08K 5/0016* (2013.01); *C08L 1/28* (2013.01); *C09J 105/00* (2013.01); *C08J 2301/00* (2013.01); *C08J 2301/28* (2013.01); *C08J 2303/02* (2013.01); *C08J 2303/04* (2013.01)

(58) Field of Classification Search
None
See application file for complete search history.

(56) References Cited

U.S. PATENT DOCUMENTS

| 3,830,762 | A * | 8/1974 | Abbott ........................... 524/29 |
| 5,959,017 | A | 9/1999 | Eck et al. |
| 6,350,808 | B1 | 2/2002 | Schmitz et al. |
| 2002/0045692 | A1 | 4/2002 | Fiedler et al. |
| 2005/0014881 | A1 | 1/2005 | Weitzel et al. |
| 2009/0092840 | A1 | 4/2009 | Schlumpf et al. |
| 2009/0223416 | A1 | 9/2009 | Aberle et al. |
| 2010/0234490 | A1 | 9/2010 | Gäberlein et al. |
| 2011/0265693 | A1 | 11/2011 | Hoetzl et al. |
| 2012/0097076 | A1 | 4/2012 | Stohr et al. |
| 2012/0328788 | A1 * | 12/2012 | Willimann et al. ........ 427/393.5 |

FOREIGN PATENT DOCUMENTS

| CA | 2198773 A1 | 3/1996 |
| CN | 101244913 A | 8/2008 |
| CN | 101268028 A | 9/2008 |
| CN | 101759392 A | 6/2010 |
| DE | 199 01 307 C1 | 6/2000 |
| EP | 0 765 899 A1 | 4/1997 |

(Continued)

OTHER PUBLICATIONS

European Search Report dated Nov. 22, 2011 for related Application No. 11169505.2.

(Continued)

*Primary Examiner* — Erma Cameron
(74) *Attorney, Agent, or Firm* — Sandra B. Weiss

(57) ABSTRACT

The present invention provides a process to prepare a powdery additive suitable for improving adhesion of building material compositions to substrates having a surface energy of 50 mJ/m$^2$ or lower, measured according to DIN 5660-2: 2011-12, the additive comprising a polysaccharide and a plasticizer, wherein the plasticizer is liquid at 50° C. or lower, has a boiling point of 100° C. or higher and is selected from a specific group, comprising the steps of a) admixing the plasticizer to an aqueous medium of the polysaccharide followed by the subsequent drying of the admixture, or b) preparing a first particle comprising the plasticizer by (i) adsorbing the plasticizer onto a carrier, or by emulsifying the plasticizer with a synthetic water-soluble polymer in water and subsequently drying the emulsion, and (ii) mixing this first particle with a second particle comprising the polysaccharide wherein the mean particle size of the coarser of the first and second particle is not more than 10 times the mean particle size of the finer particle, or agglomerating the first and second particles into one particle. The invention further provides the additive obtainable by this process, use of the additive and building material compositions containing the additive as well as a process to adhere such compositions to substrates having a surface energy of 50 mJ/m$^2$ or lower.

15 Claims, No Drawings

(56) References Cited

FOREIGN PATENT DOCUMENTS

| | | |
|---|---|---|
| EP | 0 897 965 A2 | 2/1999 |
| EP | 1 193 287 A2 | 4/2002 |
| EP | 1 498 446 A1 | 1/2005 |
| EP | 1 860 131 A1 | 11/2007 |
| EP | 2 246 403 A1 | 11/2010 |
| JP | 2000-314092 A | 11/2000 |
| RU | 2 204 540 C1 | 5/2003 |
| WO | WO2005/054391 A2 | 6/2005 |
| WO | 2007/017286 A1 | 2/2007 |
| WO | 2007/036324 A1 | 4/2007 |
| WO | 2010/060659 A1 | 6/2010 |
| WO | WO2010/119017 A1 | 10/2010 |
| WO | WO 2011/073224 A2 | 6/2011 |

OTHER PUBLICATIONS

International Search Report and Written Opinion dated Sep. 13, 2012 for related Application No. PCT/EP2012/060780.
International Preliminary Report on Patentability dated Sep. 9, 2013 for related Application No. PCT/EP2012/060780.
English abstract of CN 101759392 A published Jun. 30, 2010.
English abstract of JP 2000-314092 A published Nov. 14, 2000.
English abstract of RU 2 204 540 C1 published May 20, 2003.
Barton, Ph.D. Allan F. M., "CRC Handbook of Solubility Parameters and Other Cohesion Parameters," 2nd Ed., CRC Press, 1991, pp. 123-138.
Brandrup et al., "Polymer Handbook," 4th Ed., John Wiley & Sons, Inc. (1999), p. VII/ 694-701.
Banu et al., "Contributions to Characterization of Poly(vinyl chloride)-Lignin Blends," Journal Applied Polymer Science, vol. 101 (2006) pp. 2732-2748.
Brandrup et al., "Polymer Handbook—Solubility Parameter Tables," John Wiley & Sons, vol. VII (1999) pp. 688-701.
Wang et al., "Morphology, mechanical properties, and durability of poly . . . 1,2-dicarboxylate," Polymer Eng & Science (2009) 2 pages.
Reference: Polymer Properties, Polymer Products from Aldrich, Catalog No. Z41,247-3, VII (1999) pp. 46-49.

\* cited by examiner

PROCESS AND ADDITIVE TO IMPROVE ADHESION OF COMPOSITIONS TO SUBSTRATES

This application is a national stage filing under 35 U.S.C. §371 of PCT/EP2012/060780, filed Jun. 7, 2012, which claims priority to European Patent Application No. 11169505.2, filed Jun. 10, 2011, and U.S. Provisional Patent Application No. 61/495,560, filed on Jun. 10, 2011, the contents of which are incorporated herein by reference in their entirety.

The present invention relates to a process to prepare an additive, to the additive obtainable by this process, to the use of said additive to improve adhesion to difficult-to-adhere substrates and to building material compositions containing said additive as well as to a process to adhere such compositions to difficult-to-adhere substrates.

Polysaccharides are widely used in many different compositions to play a key role in the final properties of the compositions. Polysaccharide ethers such as cellulose ethers, guar ethers and/or starch ethers are used in building material compositions to improve the rheological behaviour and/or water retention capability of the composition when mixed with water and applied onto a substrate.

However, the polysaccharides cannot—due to their chemical nature—provide good adhesion to difficult-to-adhere substrates. In the context of the present invention, difficult-to-adhere substrates are substrates having a low surface energy, which requires special means to provide adhesion. Difficult-to-adhere substrates according to the present invention have a surface energy of 50 mJ/m$^2$ or lower, in particular 40 mJ/m$^2$ or lower, measured using either a dyne test pen formulated to ISO 8296 or preferably a contact angle measurement device according to DIN 55660-2:2011-12, and include polystyrenes, polyolefines such as low density polyethylenes (LDPE), high density polyethylenes (HDPE) and polypropylenes (PP) as well as polyvinyl chlorides (PVC) and mixtures and blends thereof.

Therefore, when a building material composition needs to be adhered to such a difficult-to-bond substrate, it is required to add further components to the composition which provide good adhesion. Such a further component is e.g. a synthetic latex in the form of a water-based dispersion or of a water-redispersible polymer powder. Such latices are typically added to provide additional functions to the building material composition, such as cohesion and/or flexibility. However, in order to generate sufficient adhesion to such difficult-to-bond substrates, it is in many cases required to increase the amount of added latex above the amount needed for sufficient cohesion and/or flexibility.

It was therefore the objective of the present invention to provide an additive which improves the adhesion, in particular the adhesion to difficult-to-adhere substrates. Another object was to provide an additive with which it is possible to adjust the adhesion to difficult-to-adhere substrates separately from other properties of the building material composition such as e.g. their cohesion. While polysaccharides are already a key ingredient in building material compositions, it would therefore be a real advantage when they also could provide adhesion to difficult-to-adhere substrates. This would allow optimising the type and amount of further ingredients of the composition, e.g. water-based dispersions or water-redispersible polymer powders, independently on adjusting the adhesion to the substrates.

Surprisingly it was found that the purpose of the invention can be achieved by the provision of a process to prepare a powdery additive suitable for improving adhesion of building material compositions to substrates having a surface energy of 50 mJ/m$^2$ or lower, measured according to DIN 55660-2:2011-12, the additive comprising a solid polysaccharide and a plasticizer, wherein the plasticizer is liquid at 50° C. or lower, has a boiling point of 100° C. or higher and is selected from the group of esters, ketones, aldehydes, carbonates, aromatic compounds, heteroaromatic compounds, heterocyclic compounds, halogenated hydrocarbons, cyclic unsaturated compounds, terpenes, sulfates and sulfoxides, comprising the steps of a) admixing the plasticizer to an aqueous medium containing the polysaccharide followed by drying the admixture, or b) preparing a first particle comprising the plasticizer by (i) adsorbing the plasticizer onto a solid carrier, or emulsifying the plasticizer with a synthetic water-soluble polymer in water and subsequently drying the emulsion, and (ii) mixing this first particle with a second particle comprising the polysaccharide wherein the mean particle size of the coarser of the first and second particle is not more than 10 times the mean particle size of the finer particle, or agglomerating this first particle and this second particle into one particle.

Claimed is also an additive obtainable by the above process.

Surprisingly, the process and the additive according to the invention provide a polysaccharide with excellent adhesion properties to difficult-to-adhere substrates, i.e. to substrates having a surface energy of 50 mJ/m$^2$ or lower, measured according to DIN 55660-2:2011-12. It was found that the polysaccharide keeps its other functions, e.g. water retention and rheological profile. Furthermore, the addition amount of the additive comprising the polysaccharide and the plasticizer need to be increased only marginally due to the high adhesion efficiency of the plasticizer. The additive is easy to handle, imparts excellent storage stability and pourability. Since only a very small amount of plasticizer is required to provide adhesion, the additive comprising the polysaccharide and the plasticizer is easier to dose into compositions than the plasticizer, e.g. adsorbed onto a carrier, alone. Furthermore, the additive shows no adverse effect with other components when mixed into compositions. Upon contact with water, it provides an excellent wettability and it dissolves, disperses and/or redisperses well. The additive improves adhesion on difficult-to-adhere substrates already when applied in very small amounts, e.g. even below 0.5 wt. %, based on the total amount of dry building material composition. When the additive is obtained by mixing a first and a second particle, the fact that the mean particle size of the coarser particle is not more than 10 times the size of the mean particle size of the finer particle, reduces significantly—or even takes away completely—the risk of demixing of the particles. Because demixing is prevented to a large extent the composition of the additive remains constant during transport and storage.

Claimed also is the use of the additive of the invention in building material compositions to increase adhesion of said building material compositions to difficult-to-adhere substrates, i.e. to substrates having a surface energy of 50 mJ/m$^2$ or lower, in particular of 40 mJ/m$^2$ or lower.

The invention provides also building material compositions comprising the additive of the invention, a filler, a mineral binder and/or a water-insoluble polymer-binder.

With the present invention it is surprisingly possible to formulate building material compositions without the need of adding a suitable polymer binder to provide adhesion. In some embodiments it is even possible that such compositions can be formulated without any polymer binder, but still provide excellent adhesion to difficult-to-adhere substrates. In other embodiments the building material, composition which contains the additive of the invention, allows formulations with less polymer binders and/or with polymer binders which are better suited to increase cohesion and/or flexibility. Hence, overall a better performing formulation at same costs—or a more cost-efficient formulation with the same performance—can be obtained easily with the same or a lower number of ingredients.

Claimed is also a process to adhere building material compositions to difficult-to-adhere substrates, i.e. substrates having a surface energy of 50 mJ/m$^2$ or lower, measured according to DIN 55660-2:2011-12, comprising the step of addition of the additive of the invention to the building material composition, optionally adding and mixing with a solvent or solvent mixture and applying the obtained mixture onto the difficult-to-adhere substrate and allow to dry. The preferred solvent is water.

It was unexpected to find that the inventive process to adhere building material compositions to difficult-to-adhere substrates does not require an additional step. Hence, no changes to current processes need to be made. Furthermore, upon water addition, the compositions show an excellent wettability and mixability and the obtained mixtures can easily be applied.

It is noted that U.S. Pat. No. 5,959,017 relates to a process for the modification with liquid additives of water-redispersible dispersion powder compositions based on polymers of ethylenically unsaturated compounds. The liquid additives are applied to a pulverulent carrier material powder, which may be—among others—a cellulose, a starch or a crosslinked polysaccharide. The thus obtained powder is then added to the dispersion during the drying of the dispersion. When such products are added to cement based mortars, the open time can be extended.

RU 2 204 540 C1 relates to dry mortar mixtures for laying—among others—various tiles, fiber boards and polystyrene foam boards. The mixture contains binding component, filler and 1.0-10.0% of modifying additive composed of microsilica, plasticizer, dolomite or limestone flower and, additionally, 0.05-0.5% water-soluble cellulose ether and 0.1-5.0% redispersed powder in the form of vinyl acetate or acrylate copolymers. The claimed mixture is said to improve laying characteristics and expanded process possibilities simultaneously with simplification of laying operations. However, nothing is said that adhesion to difficult-to-bond building materials would be improved. Furthermore, the type of plasticizer is not described at all. Since a dry mortar mix is claimed and since the plasticizer is added as such, the skilled person understands that the plasticizer is a cement-superplasticizer. Such superplasticizers are high molecular weight solids and thus they decompose at elevated temperatures, but they are not a liquid at 50° C. or lower and having a boiling point of above 100° C.

WO 2010/119017 relates to dry mortar containing an ester of a) 2-ethylhexanoic acid and b) an alcohol having a boiling point of at least 160° C. Said ester is used to reduce dust-formation of the dry mortar.

And CN 101759392 relates to a cement mortar plasticizing powder, which is formed by blending kaolin powder, α-olefin sulfonate, hydroxypropyl methyl cellulose, carboxymethyl cellulose and sodium lignosulfonate. Said powder has excellent water-retaining property and plasticizing power, and provides cement mortar with excellent strength and reduced bleeding rate. Sodium lignosulfonate is a solid at room temperature and known to be a concrete plasticizer, i.e. a superplasticizer or liquefier. Thus this reference relates to a different type of material.

All these references do not disclose nor suggest the subject-matter of the present invention, including the technical effects observed.

The Additive

The additive according to the invention is in the form of a powder, which includes according to the invention also granules and/or flakes. In a preferred embodiment, the powders are well pourable, i.e. free-flowing. The pourability can be measured using the pourability test device according to Dr. Pfrengle (provided e.g. by Karg-Industrietechnik) in accordance with ISO 4342. By doing so, a certain amount of powder is scattered through a defined opening onto a slightly rough surface. The angle of repose can be determined by measuring the height of the resulting cone by using a reference table. The lower the angle of response, the better is the flowability. The angle of response is for free-flowing powders preferably between 5° and 70°, in particular between 5° and 60°.

The additive comprises as one component a polysaccharide and as another component a plasticizer. In a preferred embodiment, the sum of the polysaccharide weight and of the plasticizer weight is at least 10 wt. %, in particular at least 20 wt. %, and most preferred at least 30 wt. %, based on the total weight of the additive.

The additive can be prepared by various means. In one embodiment, the plasticizer is admixed to the polysaccharide, which is preferably in an aqueous medium, followed by the subsequent drying of the admixture. In case of a physical and/or chemical treatment of the polysaccharide, the plasticizer can be added to the polysaccharide before, during and/or after said treatment. However, in many cases it is advantageous when the plasticizer is added after the treatment to avoid any side reactions.

In the context of the present invention, the aqueous medium may be an aqueous solution, an aqueous paste, an aqueous suspension, an aqueous slurry, a gel and/or that the polysaccharide may be in a swollen state in an aqueous medium.

In another embodiment, the additive according to the invention is obtained by preparing a first particle comprising the plasticizer by (i) adsorbing the plasticizer onto a carrier, and (ii) mixing this first particle with a second particle comprising the polysaccharide.

In even another embodiment, the additive according to the invention is obtained by preparing a first particle comprising the plasticizer by emulsifying the plasticizer with a synthetic water-soluble polymer in water and subsequently drying the emulsion, and (ii) mixing this first particle with a second particle comprising the polysaccharide.

When the additive comprises a first and a second particle, it is important that the mean particle size of the coarser of the first and second particle is not more than 10 times, preferably not more than 7 times, in particular not more than 5 times, the mean particle size of the finer particle. Alternatively, and in particular when the mean particle sizes of the coarser and the finer particles differ more than a factor of 10, the first and second particles may be agglomerated into one particle, optionally followed by a subsequent crushing step if particles from a smaller size are desired. This helps to reduce—or even avoid completely—the demixing of the different particles of the additive. When particles, e.g. of the carrier, are present in agglomerated form, the particle size of the agglomerate needs to be taken into account. The particle size is measured by means of light scattering (for small particles, e.g. below 1 μm)

or light diffraction (for larger particles, e.g. above 1 µm), such as e.g. ISO 13320:2009, and indicated as volumetric mean. These techniques are well known by the skilled person.

The drying of the admixture to obtain the additive according to the invention and of the emulsified plasticizer with a synthetic water-soluble polymer in water can take place by means which are well known to the skilled person. Preferred are spray drying, including pulse combustion spray drying, freeze drying, fluidised bed drying, drum drying, dry grinding or flash drying, in which case drum drying and dry grinding are particularly preferred. Most preferred drying methods for the admixture of the plasticizer with a polysaccharide include drum drying and dry grinding, wherein the emulsified plasticizer is most preferably dried using spray drying or freeze drying.

The skilled person is well aware of techniques to adsorb the plasticizer on a carrier, techniques to emulsify the plasticizer with a synthetic water-soluble polymer in water, and techniques to mix a first particle comprising the plasticizer and the carrier with a second particle comprising the polysaccharide. These techniques are well known and established.

The obtained adsorbed powders as well as the mixture of the first and second particle, i.e. the additive, are most typically free-flowing, storage stable, and impart a good wettability when in contact with water.

In one embodiment the weight ratio of the total amount of plasticizer to the total amount of polysaccharide is preferably between about 90:10 and about 1:99, in particular between about 80:20 and about 5:95, most preferably between about 70:30 and about 20:80.

The Polysaccharide

Polysaccharides are a common and well known class of materials. The skilled person in the art knows the suitable polysaccharides and derivatives thereof which he may use for the specific composition and application.

The polysaccharide may be of natural origin or it may have been synthetically prepared. These polysaccharides are often solids at room temperature and preferably have a high molecular weight. They typically have a bulk density of about 200 g/l or higher, in particular of about 400 g/l and higher. In building material compositions, polysaccharides are typically used in an amount of about 0.05 to 3 wt. % and provide water retention and/or help to adjust the required rheology profile. Thus, they often are used also as thickeners or to provide shear thinning character to a composition. The exact types of polysaccharide used vary and depend on the specific application. They are well known to the person skilled in the art.

Non-limiting examples of polysaccharides are cold water-soluble polysaccharides and polysaccharide ethers, such as for instance cellulose ethers, starch ethers (amylose and/or amylopectin and/or their derivatives), guar ethers, dextrins and/or alginates. Also synthetic polysaccharides, e.g. anionic, nonionic or cationic heteropolysaccharides, can be used. Non-limiting examples are xanthan gum, welan gum and/or diutan gum. Particularly preferred polysaccharides are cellulose ethers, starch ethers, guar ethers, dextrines, xanthan gums, welan gums and/or diutan gums.

The polysaccharides may be physically and/or chemically modified. Physical modifications include thermal treatment which is typical for e.g. starches to obtain cold water-soluble starches. It also includes thermal degradation of starches to dextrins. Furthermore, the polysaccharide may be treated in an aqueous alkaline environment, which may be used e.g. in manufacturing of cellulose ethers. In one preferred embodiment, the polysaccharide is a physically modified starch, in particular cold water-soluble starch, dextrin and derivatives thereof.

Polysaccharides can be also chemically modified, which may be done during and/or after a physical modification. There are many different chemical treatments of polysaccharides known and it includes acid as well as enzymatic degradation of starches to dextrins. The types and methods of chemical treatments are all well known to the skilled person in the art. Non-limiting examples of modifications include the incorporation of alkyl, carboxyalkyl and/or hydroxyalkyl groups. Non-limiting examples of suitable alkyl groups include methyl, ethyl, propyl and/or long-chain, e.g. $C_{10}$ to $C_{30}$, preferably $C_{12}$ to $C_{20}$, alkyl groups. Non-limiting examples of suitable carboxyalkyl groups include carboxymethyl and/or carboxyethyl groups. Non-limiting examples of suitable hydroxyalkyl groups include hydroxyethyl and/or hydroxypropyl groups. These types of modifications are well known and preferred when making cellulose ethers and guar ethers.

Preferred cellulose ethers and guar ethers are methyl cellulose, ethyl cellulose, hydroxyethyl cellulose, hydroxypropyl cellulose, hydroxyethyl hydroxypropyl cellulose, methyl hydroxyethyl cellulose, ethyl hydroxyethyl cellulose, methyl ethyl hydroxyethyl cellulose, methyl hydroxyethyl hydroxypropyl cellulose, ethyl hydroxyethyl hydroxypropyl cellulose, methyl ethyl hydroxyethyl hydroxypropyl cellulose, carboxymethyl cellulose, hydroxyethyl guar, hydroxypropyl guar, methyl guar, ethyl guar, methyl hydroxyethyl guar, methyl hydroxypropyl guar, ethyl hydroxyethyl hydroxypropyl guar, ethyl hydroxypropyl guar, carboxymethyl guar and mixtures thereof.

The viscosity of aqueous solutions of the cellulose ether and guar ether to be used is an important means for providing the required rheological profile of the building material composition. The Brookfield viscosity of the cellulose and guar ethers, measured at 20 rpm and as a 2% aqueous solution at 20° C., is preferably between about 100 and 100,000 mPas, particularly between about 1,000 and 75,000 mPas, and in particularly preferred manner between about 5,000 and 50,000 mPas.

Furthermore, the polysaccharides may be functionalised with e.g. alkyl, preferably $C_8$- to $C_{30}$-alkyl, in particular $C_8$- to $C_{24}$-alkyl, sulfate, phosphate, amine and/or cationic groups such as ammonium groups.

Most preferred polysaccharides are dextrins, water-soluble starches and starch ethers, cellulose ethers and guar ethers modified with one or more methyl, ethyl, n-propyl-, i-propyl group, hydroxyethyl, hydroxypropyl and/or carboxymethyl group.

The Plasticizer

The term plasticizer relates, according to the invention, to plasticizers, i.e. softeners, known from and used in the plastic industry. Concrete plasticizers, i.e. superplasticizers or liquefiers, are a different class of compounds and thus they do not fall under this term.

The plasticizer that can be used in the additive for the use and the process of the invention can be any compound which is known by the person skilled in the art to soften and/or partially dissolve plastics that can be present in a substrate used as substrate for building material compositions, like polystyrene, polyvinyl chloride or polyolefins. Preferred plasticizers which are able to achieve this functionality are liquid at a temperature of 50° C. or lower, have a boiling point of 100° C. or higher, and have a solubility parameter δ at 25° C. between 22.5 $MPa^{1/2}$ and 11 $MPa^{1/2}$. Furthermore, they typically have a water solubility, i.e. a solubility in distilled water, at 23° C. of 50 g/l or lower, preferably of 20 g/l or lower and in particular of 10 g/l or lower.

In a number of documents, such as the *CRC Handbook of Solubility Parameters and Other Cohesion Parameters*, 2$^{nd}$ Ed., A. F. M. Barton, CRC Press, 1991; pp. 123-138 or the *Polymer Handbook*, 4$^{th}$ Ed., J. Brandrup et al. (Ed), John Wiley & Sons, Inc. (1999), p. VII/694-701, various solubility parameters can be found indicated by different names, all relating to the same product feature. Consequently, they are interchangeable. Thus, the Hildebrand solubility parameters $\delta$ or $\delta_t$, also known under the term cohesion parameter, the Hansen solubility parameters $\delta$ or $\delta_t$ as well as Hoy's cohesion parameters for liquids $\delta_t$ can all be taken as the parameter $\delta$ of the present invention. In case of doubt, the Hansen solubility parameter shall be used.

In case no solubility parameter $\delta$ at 25° C. can be found in or can be calculated from handbooks for plasticizers that are a liquid at a temperature of 50° C. or lower and have a boiling point of 100° C. or higher, the following test method can be used to establish that they are a plasticizer in accordance with the invention:

As indicated above, the plasticizer that can be used in the invention should be able to soften and/or partially dissolve the difficult-to-adhere substrate, e.g. the polystyrene-containing, polyolefin-containing or polyvinyl chloride-containing substrate. To satisfy this feature of the invention, the plasticizer should be capable of dissolving 1 wt. % of the plastic-containing substrate, e.g. at 23° C. and standard pressure, e.g. 1 atm. No or only slight stirring is required. This can be established by adding 0.05 g of said substrate, preferably in small pieces, to 5 g of the plasticizer. If the substrate, or the organic part of the substrate in case of a filled material, fully dissolves in the plasticizer, which in embodiments can be visually determined by the formation of a clear liquid, the plasticizer is said to be able to dissolve partially or even fully the plastics in the substrate. Preferably full dissolution takes place within 7 days, more preferably within 5 days.

Preferably, the plasticizer has a solubility parameter $\delta$ at 25° C. of 12 MPa$^{1/2}$ or higher, in particular 14 MPa$^{1/2}$ or higher.

Preferably, the plasticizer has a boiling point of 150° C. or higher. In one embodiment, the boiling point of the plasticizer is below 400° C.

The plasticizer may be selected from the group of esters, ketones, aldehydes, carbonates, aromatic compounds, heteroaromatic compounds, heterocyclic compounds, halogenated hydrocarbons, cyclic unsaturated compounds, terpenes, sulfates and sulfoxides.

Of course, the person skilled in the art will be able to select the best plasticizer once the substrate on which the composition is to be applied is known.

The amount of plasticizer in the building material composition (based on solids, w/o liquid) in one embodiment is 0.01 to 5 wt. %, preferably 0.02 to 2 wt. %, in particular 0.05 to 1 wt. %.

Below are non-limiting examples of liquids that are suitable as plasticizers in the present invention.

Esters:

To the class of carboxylic acid esters belong saturated and unsaturated alkyl esters of $C_1$ to $C_{22}$ carboxylic acids, including fatty acid esters, such as $C_1$ to $C_8$ alkyl esters of $C_6$ to $C_{18}$ carboxylic acids. Non-limiting examples are methyl, ethyl, propyl, butyl, pentyl, hexyl, heptyl, octyl, nonyl, decyl, dodecyl, allyl and/or benzyl esters of hexanoic acid, heptanoic acid, octanoic acid, nonanoic acid, decanoic acid, dodecanoid acid, tetradecanoic acid, hexadecanoic acid, octadecanoid acid, eicosanoid acid, lauric acid, myristic acid, palmitic acid, stearic acid, arachidic acid, myristoleic acid, palmitoleic acid, sapienic acid, oleic acid, linoleic acid, linolenic acid, arachidonic acid, eicosapentaenoic acid, erucic acid, docosahexaenoic acid, rape oil methylester, alkyl sulfonic phenyl esters, also known under the trade names Mesamoll, Mesamoll II, and Mesamoll TP LXS 51067 from Lanxess, their mixtures, and derivatives thereof. Preferred are methyl, ethyl, propyl and/or butyl esters of decanoic acid, lauric acid, myristic acid, palmitic acid, rape oil, sulfonic phenyl esters, and mixtures thereof.

To the class of dicarboxylic acid esters belong in particular $C_1$ to $C_{12}$ alkyl esters of $C_2$ to $C_{20}$ dicarboxylic acids, such as $C_1$ to $C_{12}$ alkylesters of oxalic acid, malonic acid, succinic acid, glutaric acid, adipic acid, pimelic acid, suberic acid, azelaic acid, sebacaic acid, maleic acid, phthalic acid, as well as their mixtures and derivatives thereof. Non-limiting examples are dibutyl, dihexyl, and dioctyl oxalate; dipropyl, dibutyl, and dihexyl malonate; dimethyl, diethyl, and dipropyl succinate; dimethyl, diethyl, and dipropyl glutarate; bis (2-ethylhexyl)adipate; dimethyl, diethyl, and dipropyl adipate; monomethyl adipate, dioctyl adipate; dimethyl, diethyl, and dipropyl pimelate; dibutyl sebacate, dimethyl, diethyl, dipropyl, and di-n-butyl maleate; diisobutyl maleate, bis(2-ethylhexyl)phthalate, diisononyl phthalate, bi(n-butyl)phthalate, butyl benzyl phthalate, diisodecyl phthalate, di-n-oxtyl phthalate, diisooctyl phthalate, diethyl phthalate, diisobutyl phthalate, di-n-hexyl phthalate, as well as their mixtures and derivatives thereof. Preferred are diisononyl phthalate, dioctyl phthalate, dibutyl phtalate, dimethyl and diethyl adipate, dihexyl malonate, dihexyl and dioctyl oxalate, diisononyl-1, 2-cyclohexane dicarboxylate, also known under the trade name Hexamoll® DINCH from BASF, 2,2'-ethylenedioxydiethylbis(2-ethylhexanoate), also known under the trade name Oxfilm 351 from Oxea Chemicals, and mixtures thereof. Particularly preferred are di-alkylcyclohexane dicarboxylates with the alkyl groups being a $C_4$ to $C_{12}$ group, e.g. diisononyl-1,2-cyclohexane dicarboxylate, and alkylene dioxydialkylbisalkyl alkanoates, with the alkylene and alkyl groups being a $C_2$ to $C_4$ group and the alkane group being a $C_4$ to $C_{10}$ group, e.g. 2,2'-ethylenedioxydiethylbis(2-ethylhexanoate).

To the class of tricarboxylic acid esters belong in particular $C_1$ to $C_{12}$ alkyl esters of citric acid, iso citric acid, aconitic acid, propane-1,2,3-tricarboxylic acid, trimesic acid, trimellitic acid, and their derivatives. Non-limiting examples are triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, acetyl tri-n-decyl citrate, trimethyl trimellitate, tri-(2-ethylhexyl)trimellitate, tri-(n-octyl, n-decyl)trimellitate, tri-(heptyl, nunyl) trimellitate, n-octyl trimellitate, as well as their mixtures and derivatives thereof. Preferred are acetyl tributyl citrate, butyryl trihexyl citrate, acetyl trioctyl citrate, trioctyl citrate, triethyl citrate, acetyl tri-n-decyl citrate, and mixtures thereof.

To the class of esters belong also oils and fats, including vegetable oils such as olive oil, palm oil, soybean oil, canola oil, pumpkin seed oil, corn oil, sunflower oil, safflower oil, peanut oil, grape seed oil, sesame oil, argan oil, rice bran oil, mustard oil, almond oil, ghee, cottonseed oil, grape seed oil, diacylglycerol (DAG) oil, walnut oil, as well as their mixtures and derivatives thereof. Furthermore, also animal fats such as lard and butter can be used.

Fatty Alcohols:

To the class of fatty alcohols belong $C_6$ to $C_{35}$ saturated and unsaturated alcohols. Non-limiting examples of fatty alcohols are capryl alcohol, pelargonic alcohol, capric alcohol, lauryl alcohol, myristyl alcohol, cetyl alcohol, palmitoleyl alcohol, isostearyl alcohol, elaidyl alcohol, oleyl alcohol, linoleyl alcohol, elaidolinoleyl alcohol, linolenyl alcohol, elaidolinolenyl alcohol, ricinoleyl alcohol, arachidyl alcohol, behenyl alcohol, erucyl alcohol, lignoceryl alcohol, ceryl alcohol, montanyl alcohol, cluytyl alcohol, myricyl alcohol, melissyl alcohol, geddyl alcohol, cetearyl alcohol, as well as their mixtures and derivatives thereof. Particularly preferred are capric alcohol, lauryl alcohol, myristyl alcohol, cetyl alcohol, palmitoleyl alcohol.

Ketones, Including Diketones:

Non-limiting examples of ketones and diketones are acetophenone, benzophenone, acetylacetone, isophorone, cyclohexanone, n-hexanone, i-hexanone, methyl isobutylketone, diisopropyl ketone, dibutyl ketone, as well as the various isomers of heptanone and octanone, as well as their mixtures and derivatives thereof. Particularly preferred are diisopropyl ketone and dibutyl ketone.

Formamides:

Non-limiting examples of dialkyl formamides are diethyl formamide, dipropyl formamide, as well as their mixtures and derivatives thereof.

Carbonates:

Non-limiting examples of carbonates are alkyl carbonates, including dialkyl carbonates, such as methyl ethyl carbonate, diethyl carbonate, methyl propyl carbonate, ethyl propyl carbonate, di-n-propyl carbonate, di-n-propyl carbonate, dibutyl carbonate, as well as cyclic carbonates, such as ethylene carbonate, propylene carbonate, and butylene carbonate, as well as their mixtures and derivatives thereof. Preferred are di-n-propyl carbonate, dibutyl carbonate, propylene carbonate, and butylene carbonate, and mixtures thereof.

Aromatic Compounds:

To the class of aromatic compounds belong also alkyl benzoates, including $C_1$ to $C_{12}$ benzoates, toluene, xylene, cresole, mono-, di- and tri-styrenated phenols, $C_1$ to $C_{12}$ alkyl phenols, as well as their mixtures and derivatives thereof. Particularly preferred are cresol and styrenated phenols.

Heteroaromatic Compounds:

The class of heteroaromatic compounds includes also pyridine.

Heterocyclic Compounds:

To the class of heterocyclic compounds belong also pyrrolidone including 2-pyrrolidone and n-methylpyrrolidone, lactones including butyrolactone and valerolactone, lactams including butyrolactam and valerolactam, furfuryl alcohol and tetrahydrofurfuryl alcohol, dioxane, as well as their mixtures and derivatives thereof.

Furthermore, it is also possible to use halogenated hydrocarbons.

The class of cyclic, unsaturated compounds includes hemiterpenes, monoterpenes such as α-, β-, γ-terpinenes, sesquiterpenes, diterpenes, sesterterpenes, triterpenes, tetraterpenes.

Non-limiting examples of monoterpenes are camphorchinon, menthol, limonene, pinene, menthadiene and/or terpinene, as well as their mixtures and derivatives thereof.

Particularly preferred are limonene, terpinene, menthadiene, pinene, squalen and derivatives and mixtures thereof.

Sulfates and Sulfonates:

The class of sulfates and sulfonates includes $C_{12}$ to $C_{18}$ alkyl monoesters of sulfuric acid and sulfonic acid, as well as their mixtures and derivatives thereof.

Sulfoxides:

To the class of sulfoxides belong dialkyl sulfoxide, in particular with $C_1$ to $C_6$ alkyl groups, such as diethyl sulfoxide, as well as their mixtures and derivatives thereof.

The Carrier

The carrier that can be used in the present invention is preferably an inorganic carrier or filler. Examples of inorganic carriers or fillers are alumosilicate, silicon oxide, silicon dioxide, aluminium silicon oxide, calcium silicate hydrate, aluminium silicate, magnesium silicate, magnesium silicate hydrate, magnesium aluminium silicate hydrate, mixtures of silicic acid anhydrite and kaolinite, aluminium silicate hydrate, calcium aluminium silicate, calcium silicate hydrate, aluminium iron magnesium silicate, calcium carbonate, calcium magnesium carbonate, calcium metasilicate, anticaking agents, particulate titanium dioxide, expanded perlite, cellite, cabosil, circosil, aerosil, eurocell, fillite, promaxon, china clay, dolomite, limestone powder, chalks, layered silicates and/or precipitated silicas. Preferred are silicate, silicon dioxide, silica fume, fumed silica, carbonates, kaolin and/or china clay and most preferred are silicate, silicon dioxide and/or fumed silica.

In a preferred embodiment the carrier has a primary particle size diameter (PSD) of below 1 micrometer. It can be as small as e.g. 0.1 μm or lower, but in general, due to the toxicity associated with the respiration of small dust particles and for handling reasons, it is preferred that these primary particles easily form aggregates and as such have particle sizes, measured e.g. by light scattering or light diffraction, such as e.g. ISO 13320:2009, of e.g. 10 to 300 μm, preferably 15 to 200 μm.

Even more preferably, the inorganic filler exhibits cementitious properties.

Well-known examples of fillers that exhibit cementitious properties are pozzolans and latent hydraulic binders. Pozzolans are materials that may be used as an addition to cement mixtures to increase the long-term strength and other material properties. Pozzolans are primarily siliceous or aluminosiliceous materials which react with calcium hydroxide to form calcium silicates. The most commonly used pozzolan today is fly ash, though silica-fume, high-reactivity metakaolin, ground granulated blast furnace slag, and other materials are also known as pozzolans. Volcanic ash and pulverized brick additives added to burnt lime, as well as cement particles, can function as a hydraulic binder. Examples of latent hydraulic binders or pozzolanes are metakaolin, burnt shale, diatomaceous earth, moler, rice husk ash, air cooled slag, calcium metasilicate and/or volcanic slag, volcanic tuff, trass, silica fume, microsilica, blast-furnace slag, and/or silica dust The carrier has preferably a BET surface area, measured according to ISO 5794-1, of at least 10 m$^2$/g, preferably of at least 50 m$^2$/g, in particular of at least 75 m$^2$/g, and most preferably of at least 100 m$^2$/g. In one embodiment the BET surface area can be as high as up to 1,000 m$^2$/g, preferably it is up to 600 m$^2$/g.

In one embodiment the weight ratio of the total amount of carrier to the total amount of plasticizer is preferably between about 75:25 and about 5:95, in particular between about 70:30 and about 10:90, most preferably between about 60:40 and about 20:80.

The Synthetic Water-Soluble Polymer

The synthetic water-soluble polymers are solids at room temperature and preferably have a molecular weight of about 1,000 or higher, in particular of about 5,000 or higher. When several water-soluble polymers are used, use can also be made of a combination of one or more biopolymers with one or more synthetic water-soluble polymers. The latter typically have a bulk density of about 200 g/l or higher, in particular of about 400 g/l and higher. Hollow solid polymer particles are less preferred.

Synthetic water-soluble polymers may consist of one or several polymers, for instance one or more polyvinyl pyrrolidones and/or polyvinyl acetals with a molecular weight of 2,000 to 400,000, fully or partially saponified polyvinyl alcohols and their derivatives, which can be modified for instance with amino groups, carboxylic acid groups and/or alkyl groups, with a degree of hydrolysis of preferably about 70 to 100 mol. %, in particular of about 80 to 98 mol. %, and a Höppier viscosity in 4% aqueous solution of preferably 1 to 100 mPas, in particular of about 3 to 50 mPas (measured at 20° C. in accordance with DIN 53015), as well as melamine formaldehyde sulfonates, naphthalene formaldehyde sulfonates, polymerizates of propylene oxide and/or ethylene oxide, including their copolymerizates and block copolymerizates, styrene-maleic acid and/or vinyl ether-maleic acid copolymerizates.

Preferred synthetic water-soluble polymers are fully or partially saponified polyvinyl alcohols and their derivatives, polyvinyl pyrrolidone, polyvinyl acetal, melamine formaldehyde sulfonates, naphthalene formaldehyde sulfonates, polymerizates of propylene oxide and/or ethylene oxide, including their copolymerizates and block copolymerizates, styrene-maleic acid and vinyl ether-maleic acid copolymerizates. Most preferred are partially saponified, optionally modified, polyvinyl alcohols with a degree of hydrolysis of 80 to 98 mol. % and a Höppier viscosity as 4% aqueous solution of 1 to 50 mPas and/or polyvinyl pyrrolidone.

In one embodiment the weight ratio of the total amount of plasticizer to the total amount of water-soluble polymer is preferably between about 90:10 and about 5:95, in particular between about 75:25 and about 10:90, most preferably between about 60:40 and about 20:80.

The Substrate

The additive according to the invention is particularly suited to improve adhesion of building material compositions on difficult-to-bond substrates, in particular to difficult-to-bond substrates based on organic polymers. Such difficult-to-bond substrates are known to the skilled person and they have typically a surface energy, measured according to DIN 55660-2:2011-12, of 50 mJ/m$^2$ or lower, in particular 40 mJ/m$^2$ or lower. These substrates include substrates which consist of or contain polystyrene, polyolefine such as low density polyethylene (LDPE), high density polyethylene (HDPE) and polypropylene (PP), polyvinyl chloride (PVC), laminate, linoleum, bitumen, coatings such as alkyd-based paints, water-based paints, polymer-based renders, primers, polyester, phenolic and epoxy resins, Acrylonitrile Butadiene Styrene (ABS), polyamide such as nylon and/or polycarbonate. Particularly preferred substrates are substrates containing polystyrene, polyolefine, polyvinyl chloride, laminate, linoleum, bitumen, paints, i.e. a composition comprising a water-insoluble polymer binder and a pigment, including TiO$_2$, and/or polymer-based renders, i.e. renders comprising a water-insoluble polymer binder and a filler.

An example of polystyrene-containing building substrates is expanded polystyrene, which is widely used for thermal insulation of buildings. Expanded polystyrene may be modified with graphite. Another polystyrene-containing substrate is extruded polystyrene, also known under the abbreviation XPS. Hence, building material compositions containing the additive according to the invention are—among others—particularly suited to bond the expanded polystyrene to the wall, which often is a concrete or a brick wall, as well as for base coat and top coat mortars, into which commonly a glass fiber net is embedded. Building material compositions including mortars for this application are also called thermal insulation mortars. The complete system is often also referred to as External Insulation Finishing System (EIFS).

Examples of polyolefin- and polyvinyl chloride-containing substrates are floors which are covered with bitumen, polyolefin- and polyvinyl chloride-containing material such as PVC or polyolefin tiles, laminates, linoleum, rolled layers of a PVC or polyolefin covering, carpets, remainders thereof and/or adhesives used to adhere said substrates to the floor. In particular when renovating rooms with floors containing such substrates, or residues thereof, e.g. after removing a carpet, the additive and the building material composition or adhesive composition according the invention facilitate significantly the adhesion onto such substrates. Hence, it is not anymore required to remove all remaining residues of the former flooring substrate and of the adhesive which was used.

Building material compositions for application on floors can be formulated as screeds, as sealing compounds, primers, parquet adhesives and/or levelling compounds.

Examples of coatings as substrates, e.g. alkyd-based paints, water-based paints and polymer-based renders, are walls which are covered with remainders of said coatings. Hence, building material compositions containing the additive of the invention are particularly suited to be used to adhere on said wall substrates.

Furthermore, wall papers, laminate, linoleum, polyolefine, polyester, phenolic and epoxy resins, Acrylonitrile Butadiene Styrene (ABS), polyamide such as nylon and/or polycarbonate are further examples of substrates which can be better adhered to using a building material composition containing the additive according to the invention.

The Building Material Composition

Where in this specification the term "building material composition" is used, it must be understood that this term includes mortars and it covers a mix of one or more inorganic or organic binders, aggregates, fillers, additives and/or admixtures. A building material composition component is an ingredient of the final building material composition. Such building material compositions, mortars and mortar components are well known to the person skilled in the art.

In one embodiment, the building material composition is a dry mortar or contains a dry mortar component, the additive is added as a powder to the dry mortar or dry mortar component, and the mortar is mixed with water and optional further liquid components prior to its application.

In another embodiment, the building material compositions is a pasty mortar or contains a liquid component, the additive is added as a liquid dispersion to the pasty mortar or the liquid component, and the mortar is mixed with the liquid dispersion or the liquid component prior to its application.

The building material composition in accordance with the invention is preferably a dry mortar. However, it also can be a pasty mortar or a mortar having two or more components, such as e.g. a cementitious, dry component and a liquid component containing various organic compounds. In one embodiment the dry mortar formulation contains no mineral binder. In another embodiment, it contains one or more mineral binders.

Building material composition can—in the form of a dry, pasty, two or multi-component mortar—be formulated as coating or composite material used for thermal insulation (ETICS), sealing applications, e.g. sealing compounds, flexible water-proofing membranes, plasters, repair mortar, tile grouts, ceramic tile adhesives (CTA), parquet adhesives, plywood adhesives, primers, undercoats, coatings for concrete and mineral-bonded surfaces, e.g. skim coats, levelling compounds and screed, e.g. self-levelling floor screeds, powder paints and/or smoothing and/or toweling compounds.

The additive of the invention for building material compositions comprises as polysaccharide preferably one or more cellulose ethers and/or guar ethers modified with alkyl and/or hydroxyalkyl groups and/or water-soluble starch ethers.

The building material composition according to the invention comprises the additive of the invention, a filler, a mineral binder and/or a water-insoluble polymer-binder. In a preferred embodiment, the content of the additive is between about 0.02 and 5 wt. %, preferably between about 0.05 and 2 wt. %, in particular between about 0.1 and 1 wt. %, based on the solids of the ingredients of the building material compositions, which sum up to 100 wt. % of total composition.

Suitable mineral fillers, also known under the term aggregates include quartzitic and/or carbonatic sands and/or powders such as for instance quartz sand and/or limestone powder, carbonates, silicates, chalks, layered silicates, precipitated silicas, light-weight fillers such as for instance hollow microspheres of glass, alumosilicates, silica, aluminium-silica, calcium-silicate hydrate, silicon dioxide, aluminium-silicate, magnesium-silicate, aluminium-silicate hydrate, calcium-aluminium-silicate, calcium-silicate hydrate, calcium-metasilicate, aluminium-iron-magnesium-silicate, clays such as bentonite and/or vulcanic slag, as well as pozzolanes such as metakaolin and/or latently hydraulic components, in which case the fillers and/or light-weight fillers can also have a natural or artificially generated colour.

In the context of the invention, mineral binders are binders which are typically solids and in particular consist of at least a) a hydraulically setting binder, in particular cements, activated blast furnace slags and/or silico-calcareous fly ash, b) a latent hydraulic binder, such as in particular pozzolanes and/or metakaolin, which reacts hydraulically in combination with a calcium source such as calcium hydroxide and/or cement, and/or c) a non-hydraulic binder which reacts under the influence of air and water, in particular calcium hydroxide, calcium oxide, quicklime, hydrated lime, magnesia cements, water glass and/or gypsum, by which is meant in this invention in particular calcium sulfate in the form of α- and/or β-semihydrate and/or anhydrite of form I, II and/or III.

Preferred cements are in particular Portland cement, for instance in accordance with EN 197-1 OEM I, II, III, IV, and V, and/or calcium phosphate cement and/or aluminous cement such as calcium aluminate cement and/or calcium sulfo-aluminate cement.

Preferred latent hydraulic binders or pozzolanes are metakaolin, burnt shale, diatomaceous earth, moler, rice husk ash, air cooled slag, calcium metasilicate and/or volcanic slag, volcanic tuff, trass, fly ash, silica fume, microsilica, blast-furnace slag, and/or silica dust.

Preferred non-hydraulic binders are gypsum, by which is meant in this invention in particular calcium sulfate in the form of α- and/or β-semihydrate and/or anhydrite of form I, II and/or III, calcium hydroxide, calcium oxide, lime such as quicklime and/or hydrated lime, magnesia cements and/or water glass.

The preferred mineral binding material is a hydraulically binding material, in particular Portland cement, or a mixture of Portland cement, calcium aluminate cement, and gypsum.

In the context of the invention, water-insoluble polymer-binders may be vinyl(co)polymers, polyurethanes, poly(meth)acrylates, polyesters, polyethers, as well as mixtures and hybrids thereof. In a preferred embodiment, water-insoluble polymer-binders are aqueous polymer dispersions and water-redispersible polymer powders which may be obtained by drying the polymer dispersions. The dispersions are typically obtained by emulsion and/or suspension polymerization and may contain the vinyl(co)polymers, polyurethanes, poly(meth)acrylates, polyesters, polyethers, as well as mixtures and hybrids thereof. In a particularly preferred embodiment, the dispersions are based on (co)polymers of ethylenically unsaturated monomers preferably comprising monomers from the group of vinyl acetate, ethylene, acrylate, methacrylate, vinyl chloride, styrene, butadiene and/or $C_4$-$C_{12}$ vinyl ester monomers.

Preferred water-insoluble polymers are based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene, wherein the vinyl versatate preferably is a $C_4$- to $C_{12}$-vinyl ester, in particular a $C_9$-, $C_{10}$- and/or a $C_{11}$-vinyl ester, and the polymerizates can contain about 0-50 wt. %, in particular about 0-30 wt. %, and quite especially preferably about 0-10 wt. % of further monomers, in particular monomers with functional groups.

In a preferred embodiment, the dispersions and the water-redispersed polymer powders are film-forming at least at the higher of the application and curing temperature. Film-forming means that the copolymer is capable of forming a film determined according to DIN 53787. In a preferred embodiment, the film formation occurs at a temperature of 23° C. or higher; preferably at 10° C. or higher; in particular at 5° C. or higher.

In the context of the invention, water-soluble polymer-binders include the synthetic water-soluble polymers and the water-soluble polysaccharides mentioned above. Furthermore, proteins such as casein, gelatine and soy protein are further suitable water-soluble polymer-binders.

EXAMPLES

The invention is further elucidated with reference to the following examples. Unless indicated otherwise, the tests are carried out at a temperature of 23° C. and a relative humidity of 50%.

Example 1

Preparation of Powders P1 to P4 by Adsorption of Plasticizer on a Carrier 20.0 g of Sipernat® 22 (ex-Evonik Industries; a chemically obtained silicon dioxide having a BET surface of 190 g/m²) were placed into a 300 ml plastic beaker. The plasticizers and mixtures thereof, as indicated in Table 1 with their relative amounts, were slowly added over a period of 2 minutes to the Sipernat® 22, while continuously stirring using a 60 mm propeller stirrer with an increasing rate from low to 1,000 rpm. The resulting mixtures were further mixed for another 20 minutes to result in homogeneous, white, dry, and free-flowing powders. The plasticizers were all properly adsorbed and showed no signs of wetting when being put between fingers.

It is noted that the same procedure can be followed using other fillers.

TABLE 1

Compositions of powders P1 to P4 in wt. % obtained according to Example 1.

| Powder No | P1 | P2 | P3 | P4 |
|---|---|---|---|---|
| DBP [a] | 50 | 0 | 0 | 0 |
| DINCH [b] | 0 | 50 | 50 | 50 |
| Oxfilm 351 [c] | 0 | 0 | 10 | 0 |
| RME [d] | 0 | 0 | 0 | 10 |
| S-22 [e] | 50 | 50 | 40 | 40 |

[a] DBP stands for dibutyl phthalate (Sigma-Aldrich), which is a liquid at room temperature, having a boiling point of 340° C. and a Hansen solubility parameter of 20.3 MPa$^{1/2}$. In experiments 2-d to 2-f, it was adsorbed on Sipernat ® 22 prior to being added to the mortar mixture. 5.0 g DBP dissolve 0.05 g of the substrate used (EPS) at 23° C. within 15 minutes.
[b] DINCH stands for Diisononyl-1,2-cyclohexanedicarboxylate (HEXAMOLL DINCH ® from BASF), which is a liquid at room temperature, having a boiling point of 240-250° C. and a solubility parameter at 25° C. of 17.0 MPa$^{1/2}$. 5.0 g DINCH dissolve 0.05 g of the substrate used (EPS) at 23° C. within 3 days.
[c] Oxfilm 351 stands for 2,2'-Ethylenedioxydiethylbis(2-ethylhexanoate) (Oxea Chemicals), which is a liquid at room temperature, having a boiling point of 351° C. and a solubility parameter at 25° C. of between 22.5 MPa$^{1/2}$ and 11 MPa$^{1/2}$. 5.0 g Oxfilm 351 dissolve 0.05 g of the substrate used (EPS) at 23° C. within 15 minutes.
[d] RME stands for Rape Oil Methyl ester (Flamol Mineralöl; Bern, CH), which is a liquid at room temperature, having a boiling point of above 200° C. and a solubility parameter at 25° C. of about 17 MPa$^{1/2}$. 5.0 g RME dissolve 0.05 g of the substrate used (EPS) at 23° C. within 5 minutes.
[e] S-22 stands for Sipernat ® 22 (Evonik). It has a measured average particle size of 10 μm of the agglomerates, measured following ISO 13320: 2009, and an average primary particle size of 15 nm.

Example 2

Preparation of Powder P5 by Emulsifying the Plasticizer with a Synthetic Water-Soluble Polymer, Followed by Drying To 20.0 kg of a 20% aqueous polyvinyl alcohol solution with a degree of hydrolysis of 88 mol.-% and a Höppler viscosity as 4% solution of 4 mPas in a 50 l vessel, equipped with a propeller stirrer with a stirring speed of 500 rpm, were added slowly at room temperature 4.0 kg of 2,2'-ethylene dioxydiethylbis(2-ethylhexanoate) (OXFILM 351), while the plasticizer was emulsified completely. The obtained emulsion was subsequently dried by means of conventional spray drying at an inlet temperature of 125° C. to a white, free flowing, and readily water-redispersible powder with a mean volumetric particle size of 168 μm in good yield. No significant fouling occurred in the spraying tower during drying. 100 parts by weight of the resultant powder were mixed with 13.6 parts by weight of a 83.3:16.7 mixture of commercially available calcium/magnesium carbonate and fumed silica.

Example 3

Preparation of the Additives A1 to A9 by Mixing Cellulose Ethers with Powders P1 to P9

Each of the Powders P1 to P5 were placed with the respective cellulose ethers, as indicated in Tables 2 and 3 with amounts and types, into a 500 ml plastic beaker. The ingredients were mixed over a period of 10 minutes using a 60 mm propeller stirrer at 300 rpm to result each time in a homogeneous, white, dry and free-flowing additive which is highly storage stable (Table 2: Additives A1 to A4; Table 3: Additives A5 to A9). Furthermore, they can be easily mixed with the other components of the building material composition, i.e. the mortar, either alone or in combination.

In order to assess the demixing behaviour, 100 g of the additives, obtained by homogeneous mixing as described above, were filled into a 250 ml plastic beaker with an inner diameter of 9 cm. The beaker was covered with a lid and fixed in the laboratory sieving machine "Vibro" from Retsch using the clamping yoke. The amplitude of the Retsch instrument was adjusted to 30 (on the 10-100 scale) and the sample was allowed to vibrate. The built-in automated interval device for periodical switching-off the sieving was activated. After 60 minutes was the plastic beaker carefully removed. The top layer (2-3 g) of the additive in the beaker was rasped away by using a metal spatula, collected and the particle size was analyzed by means of light diffraction. The result was compared with the result from a sample taken after the homogeneous mixing, but before the vibration step. No change of the particle size distribution was observed within the standard deviation, hence all additives A1 to A9 showed no signs of demixing.

The same procedure was carried out with a homogeneously mixed 50:50 blend by weight of BERMOCOLL® E431 FQ, an Ethyl Hydroxy Ethyl Cellulose with a mean volumetric particle size of 143 μm, and of Sipernat® 22 (Evonik) with an mean volumetric particle size of 11 μm. The samples before and after the vibration step showed distinct different particle size distributions, hence the sample did demix.

It is noted that other analytical tests may be used to identify whether or not demixing occurred. A suitable means for additives having ingredients of different viscosities in a solvent is e.g. measuring the viscosity of the samples before and after the vibration step.

It is noted that the same mixing procedure can be applied also when other polysaccharides are used.

TABLE 2

Preparation of the additives A1 to A4 by mixing a cellulose ether with Powders P1 to P4.

| | | Additive No | | | |
|---|---|---|---|---|---|
| | | A1 | A2 | A3 | A4 |
| Powder P1-P4 | Type | P1 | P2 | P3 | P4 |
| | Amount [g] | 71.4 | 60 | 50 | 38.5 |
| | PSD [μm] | 11 | 37 | 27 | 38 |
| Cellulose ether [a] | Amount [g] | 28.6 | 40 | 50 | 61.5 |
| | PSD [μm] | 80 | 80 | 80 | 80 |

[a] As cellulose ether was Tylose ® MH 10007 P4 taken, which is a Methyl Hydroxy Ethyl Cellulose (MHEC) with a mean volumetric particle size of 80 μm.

TABLE 3

Preparation of the additives A5 to A9 by mixing of various cellulose ethers with Powder P5 prepared according to Example 2.

| Additive No | A5 | A6 | A7 | A8 | A9 |
|---|---|---|---|---|---|
| MHEC [a] [wt. %] | 66 | 50 | 0 | 0 | 0 |
| MEHEC [b] [wt. %] | 0 | 0 | 50 | 0 | 0 |
| EHEC [c] [wt. %] | 0 | 0 | 0 | 50 | 0 |
| MHPC [d] [wt. %] | 0 | 0 | 0 | 0 | 50 |
| Powder P5 [e] [wt. %] | 33 | 50 | 50 | 50 | 50 |

[a] MHEC stands for Tylose ® MH 10007 P4, which is a Methyl Hydroxy Ethyl Cellulose with a mean volumetric particle size of 80 μm.
[b] MEHEC stands for BERMOCOLL ® M10, which is a Methyl Ethyl Hydroxy Ethyl Cellulose with a mean volumetric particle size of 157 μm.
[c] EHEC stands for BERMOCOLL ® E431FQ, which is an Ethyl Hydroxy Ethyl Cellulose with a mean volumetric particle size of 143 μm.
[d] MHPC stands for Culminal ® MHPC 20000P, which is a Methyl Hydroxy Propyl Cellulose with a mean volumetric particle size of 124 μm.
[e] Powder P5 was prepared according to Example 2 and has a mean volumetric particle size of 168 μm.

The results from Table 3 indicate that the plasticizer, e.g. emulsified in a synthetic water-soluble polymer and subsequently dried, can be combined with cellulose ethers having different functional groups and particle sizes. No adverse effects are observed.

Example 4

Preparation of a Dry Mortar Master Batch and Mortar Premix

Prepared were 5 kg of a cement-based dry mortar master batch consisting of 340 parts by weight of a commercially available Portland cement OEM 142.5, 598 parts by weight of a quartz sand (0.1-0.6 mm), and 30 parts by weight of a commercially available hydrated lime, in which process the components were mixed in a 10 l vessel with a FESTOOL stirrer until a homogeneous dry mortar master batch was obtained.

For each experiment, samples of the dry mortar master batch were, where applicable, dry mixed with the additives prepared according to Example 3, Tables 2 and 3. When water-redispersible polymer powders were used as indicated in Table 4, the same mixing procedure was carried out as with the additives according to the invention. The specific amounts added are indicated in Tables 4 and 5.

300 g of the obtained dry mixtures were added slowly to water while stirring. The amount of water used is also indicated in Tables 4 and 5. This mixture was stirred for one minute with a 60 mm propeller stirrer with a speed of 800 rpm. After a maturing time of 3 minutes the mortar was again stirred by hand for 15 seconds before it was applied.

Example 5

Determination of the Adhesive Strengths on Expanded Polystyrene, Following ETAG 004 (Guideline for European Technical Approval of External Thermal Insulation Composite Systems with Rendering, European Organisation for Technical Approvals)

Using a spacer, the mortar samples from Example 4 were applied with a thickness of 3 mm onto expanded polystyrene (EPS) blocks having the dimensions 500 mm×100 mm×60 mm and a density of 20 kg/m$^3$. The specimens were stored at 23° C. and 50% relative humidity for 7 days (dry storage). Another set of specimens after the same dry storage period was immersed in water for 1 day (wet storage). One day before the end of the dry storage period, 5 circles were drilled 5 mm deep into the EPS, using a crown driller with an inside diameter of 50 mm. Afterwards, metal plates with a 50 mm outer diameter were glued onto the cut mortar circles. The adhesive strengths and pull-out were determined in accordance with ETAG 004 by vertically pulling up the metal plate with the mortar specimen glued to it. The obtained data were averaged over the number of measured samples. The percentages of the pull-out were assessed visually. The measured adhesive strengths in N/mm$^2$ are of less relevance, since they indicate the cohesion of the substrate at a 100% pull-out. At 0% pull-out, the values are so low that the adhesion of the mortar to the substrate is negligible.

TABLE 4

Adhesion strengths and pull-out of various mortar samples containing additives A1 to A4 on EPS.

| | | Exp. No (R = reference) | | | | | |
|---|---|---|---|---|---|---|---|
| | | 4.1R | 4.2R | 4.3 | 4.4 | 4.5 | 4.6 |
| Additive | Type | N/A | N/A | A1 | A2 | A3 | A4 |
| | Amount (wt. %) | (0.2)$^{g)}$ | (0.2)$^{g)}$ | 0.7 | 0.5 | 0.4 | 0.325 |
| RPP $^{a)}$ | | 0 | 3.0$^{h)}$ | 0 | 1.2 | 0.8 | 1.125 |
| H$_2$O $^{b)}$ [%] | | 22 | 22 | 21 | 21 | 21 | 21 |
| dry $^{c)}$ [%] | | 0 | 90 | 100 | 100 | 100 | 100 |
| dry $^{d)}$ [N/mm$^2$] | | 0.05 | 0.16 | 0.15 | 0.12 | 0.12 | 0.11 |
| wet $^{e)}$ [%] | | 0 | 50 | 100 | 100 | 100 | 95 |
| wet $^{f)}$ [N/mm$^2$] | | 0.07 | 0.12 | 0.15 | 0.11 | 0.10 | 0.11 |

$^{a)}$ As water-redispersible polymer powder (RPP) was a polyvinyl alcohol-stabilized, ethylene-vinyl acetate copolymer with a glass transition temperature T$_g$ of 42° C. (ELOTEX ® MP2060) added.

$^{b)}$ Amount of added water to make up the mortar, based on 100 g dry mortar, including the mentioned additives.

$^{c)}$ Pull-out after dry storage, see text for details; 100% refers to 100% pull-out (only cohesion failure within the EPS) and 0% refers to no EPS pull-out, but just adhesion failure between the EPS-mortar interface.

$^{d)}$ Measured adhesion/cohesion strength of specimen after dry storage.

$^{e)}$ Pull-out after wet storage, see text for details.

$^{f)}$ Measured adhesion/cohesion strength of specimen after wet storage.

$^{g)}$ This value represents the amount of cellulose ether (MHEC; Tylose ® MH10007 P4) added without any plasticizer.

$^{h)}$ Another type of water redispersible polymer powder was added, which is particular suited for adhesion on EPS, which is a polyvinyl alcohol-stabilized, ethylene-vinyl acetate copolymer with a glass transition temperature T$_g$ of −4° C. (ELOTEX ® FX2320).

The Reference Examples 4.1R and 4.2R did not contain an additive according to the invention. The amount indicated (0.2 wt. %) refers to the amount of cellulose ether added. The same application result were obtained when using different types of cellulose ether, including the ones used e.g. in additives A7 to A9.

The results from Table 4 show that a mortar without an additive according to the invention, but only with a mere cellulose ether (Example 4.1R) does not adhere to EPS, since the pull-out is 0% after both dry and wet storage. However, in order to provide acceptable adhesion to EPS, the state-of-the-art technology suggests the addition of suitable water-redispersible polymer powders (RPP). As indicated by Example 4.2R, an added amount of about 3 wt. % of a suitable RPP is required to provide good adhesion after dry storage. However, after wet storage only 50% pull-out is obtained with this amount of RPP.

When use is made of an additive according to the invention, comprising a cellulose ether, i.e. a polysaccharide, and small amount of a suitable plasticizer (e.g. only 0.25 wt. % in Exp. 4.3) or mixture of plasticizers (e.g. only 0.075 wt. % of plasticiser in Exp. 4.6 with additive A4, see also Tables 1 and 2) which was adsorbed on an inorganic carrier and admixed to the cellulose ether (0.2 wt. %), good to excellent pull-out is achieved after dry and wet storage (Examples 4.3 to 4.6).

The water-redispersible polymer powder (RPP) employed in Examples 4.4 to 4.6 does not contribute to the adhesion of the mortar to EPS, since it is less suited for this purpose and a smaller amount is added compared to Example 4.2R. However, since the RPP used in Examples 4.4 to 4.6 is a better choice to increase the cohesion of the mortar as well as providing adhesion of the mortar to a polar substrate such as e.g. concrete, less RPP—if any—is required in the mortar formula. Additionally, the type and amount of RPP can be particularly selected to optimize the other properties, including cohesion, impact resistance and improved adhesion to inorganic substrates.

The amount of cellulose ethers used in mortars is often fairly low, e.g. only 0.2 wt. % or even lower. Hence, it is often a challenge to dose in the exact amounts. Although only a tiny amount of plasticizer is required to provide sufficient adhesion to EPS, the combination of the cellulose ether with the plasticizer, e.g. adsorbed on a carrier or emulsified in a synthetic water-soluble polymer and subsequently dried, increases the amount of additive to be dosed in. Therefore, it is easier to add the exact amount of additive and irregularities become less, which is a big advantage in manufacturing mortars, i.e. building material composition, in particular when they are in dry and one component form.

TABLE 5

Adhesion strengths, pull-out and hydrophobicity of various mortar samples containing additives A5 to A9 on EPS. It is noted that the mortars do not contain any further adhesion promoter, in particular no water-redispersible polymer powders.

| | Ex. No (R = reference) | | | | | |
| --- | --- | --- | --- | --- | --- | --- |
| | 5.1R | 5.2 | 5.3 | 5.4 | 5.5 | 5.6 |
| Additive No | Ref | A5 | A6 | A7 | A8 | A9 |
| Amount of additive wt % | (0.2)[a] | 0.3 | 0.4 | 0.3 | 0.3 | 0.3 |
| $H_2O$ [%] | 21 | 21 | 21 | 20 | 20 | 20 |
| Dry [%] | 0 | 95 | 100 | 100 | 100 | 75 |
| Dry [N/mm$^2$] | 0.04 | 0.12 | 0.13 | 0.11 | 0.11 | 0.11 |
| Wet [%] | 0 | 75 | 100 | 100 | 95 | 90 |
| Wet [N/mm$^2$] | 0.05 | 0.10 | 0.10 | 0.11 | 0.10 | 0.11 |

[a] The additive did not contain plasticizer. The amount indicated refers to the amount of cellulose ether added, which is ethyl hydroxyethyl cellulose (EHEC; BERMOCOLL® E431FQ) with a mean volumetric particle size of 143 μm.

The results from Table 5 show that additives according to the invention can be used comprising different types of cellulose ethers. No adverse application data result from the combination of cellulose ethers with powder P5, i.e. with the component comprising the plasticizer (see also Table 3). The fact, that the dry pull-out values in Example 5.6 are slightly reduced (75%), is attributed to the type of derivatisation of the cellulose ether in additive A9 (MHPC, which is methyl hydroxypropyl cellulose) and not due to an incompatibility of the plasticizer with the polysaccharide.

Example 5.2 from Table 5 contains 0.3 wt. % of additive A5, which is the same amount as e.g. in Example 5.4 using additive A7. However, the pull-out values in Ex. 5.2 are 95% after dry and 75% after wet storage, respectively. On the contrary, in Ex. 5.4 the pull-out values are 100% after both, dry and wet storage. However, the amount of plasticizer in Ex. 5.2 is only 0.043 wt. %, which is 33% lower than in Ex. 5.4 having 0.065 wt. %. Hence, it is very surprising that the additive A5, which is according to the invention, boosts the adhesion to EPS so much, although the amount of plasticizer in the final building material composition is even less than 0.05 wt. % on dry weight.

As a conclusion, it is very surprising that an additive according to the invention needs to be dosed in an amount of e.g. only 0.3 wt. % to provide an excellent adhesion to a difficult-to-bond substrate, e.g. expanded polystyrene (EPS), to provide a 100% pull out, even after wet storage. Additionally, this small amount of additive provides also excellent fresh mortar properties such as water-retention, workability as well as a rheological profile according to the needs (see e.g. Examples 4.6, 5.2, 5.4 and 5.5).

The invention claimed is:

1. Process to prepare a powdery additive suitable for improving adhesion of building material compositions to substrates having a surface energy of 50 mJ/m$^2$ or lower, measured according to DIN 55660-2:2011-12, the additive comprising a solid polysaccharide and a plasticizer, wherein the plasticizer is liquid at 50° C. or lower, has a boiling point of 100° C. or higher and is selected from the group of esters, ketones, aldehydes, carbonates, aromatic compounds, heteroaromatic compounds, heterocyclic compounds, halogenated hydrocarbons, cyclic unsaturated compounds, terpenes, sulfates and sulfoxides, comprising the steps of
   a) admixing the plasticizer to an aqueous medium containing the polysaccharide followed by drying the admixture, or
   b) preparing a first particle comprising the plasticizer by (i) adsorbing the plasticizer onto a solid carrier, or emulsifying the plasticizer with a synthetic water-soluble polymer in water and subsequently drying the emulsion, and (ii) mixing this first particle with a second particle comprising the polysaccharide wherein the mean particle size of the coarser of the first and second particle is not more than 10 times the mean particle size of the finer particle, or agglomerating this first particle and this second particle into one particle, and wherein the polysaccharide is selected from
- a polysaccharide ether containing alkyl, carboxyalkyl and/or hydroxyalkyl groups;
- a dextrine;
- a cold-water soluble starch; and
- a derivative of any of the foregoing;

and wherein the sum of the polysaccharide weight and of the plasticizer weight is at least 10 wt. % based on the total weight of the additive.

2. Process of claim 1, wherein the polysaccharide ether is a cellulose ether or a guar ether, wherein the alkyl group is a methyl, ethyl and/or propyl group, the carboxyalkyl group is a carboxymethyl and/or carboxyethyl group and/or the hydroxyalkyl group is a hydroxyethyl and/or hydroxypropyl group.

3. Process of claim 2, wherein the plasticizer has a solubility parameter $\delta$ at 25° C. between 22.5 $MPa^{1/2}$ and 11 $MPa^{1/2}$.

4. Process of claim 3, wherein the weight ratio of the plasticizer to the polysaccharide is between 90:10 and 1:99.

5. Process of claim 4, wherein the carrier has a BET surface area, measured according to ISO 5794-1, of at least 10 $m^2/g$.

6. Process of claim 5, wherein the synthetic water-soluble polymer is selected from the group of fully or partially saponified polyvinyl alcohols and their derivatives, polyvinyl pyrrolidone, polyvinyl acetal, melamine formaldehyde sulfonates, naphthalene formaldehyde sulfonates, polymerizates of propylene oxide and/or ethylene oxide, copolymerizates of propylene oxide and/or ethylene oxide, block copolymerizates of propylene oxide and/or ethylene oxide, styrene-maleic acid and vinyl ether-maleic acid copolymerizates.

7. Process of claim 1, wherein the plasticizer has a solubility parameter $\delta$ at 25° C. between 22.5 $MPa^{1/2}$ and 11 $MPa^{1/2}$.

8. Process of claim 1, wherein the weight ratio of the plasticizer to the polysaccharide is between 90:10 and 1:99.

9. Process of claim 1, wherein the carrier has a BET surface area, measured according to ISO 5794-1, of at least 10 $m^2/g$.

10. Process of claim 1, wherein the synthetic water-soluble polymer is selected from the group of fully or partially saponified polyvinyl alcohols and their derivatives, polyvinyl pyrrolidone, polyvinyl acetal, melamine formaldehyde sulfonates, naphthalene formaldehyde sulfonates, polymerizates of propylene oxide and/or ethylene oxide, copolymerizates of propylene oxide and/or ethylene oxide, block copolymerizates of propylene oxide and/or ethylene oxide, styrene-maleic acid and vinyl ether-maleic acid copolymerizates.

11. An additive obtainable by the process of claim 1.

12. A method for increasing the adhesion of a building material composition to a difficult-to-bond substrate, said method comprising providing a building material composition that comprises the additive according to claim 11, wherein said substrate has a surface energy of 50 $mJ/m^2$ or lower, measured according to DIN 55660-2:2011-12, and wherein the content of said additive is an amount sufficient to improve adhesion of said building material composition to said substrate.

13. The method according to claim 12, wherein the substrate having a surface energy of 50 $mJ/m^2$ or lower is a substrate containing polystyrene, polyolefine, polyvinyl chloride, linoleum and/or bitumen.

14. A building material composition comprising the additive of claim 11, a filler, a mineral binder and/or a water-insoluble polymer-binder.

15. A process to adhere a building material composition to a substrate having a surface energy of 50 $mJ/m^2$, measured according to DIN 55660-2:2011-12, comprising the step of adding the additive of claim 7 to the building material composition, optionally adding and mixing with a solvent or solvent mixture, applying the obtained composition onto the substrate, and allowing the applied composition to dry.

* * * * *